US007009913B2

(12) United States Patent
Yuzawa et al.

(10) Patent No.: US 7,009,913 B2
(45) Date of Patent: Mar. 7, 2006

(54) SEQUENCE CONTROLLER

(75) Inventors: Shinichi Yuzawa, Tokyo (JP); Satoshi Udou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/530,360

(22) PCT Filed: Oct. 6, 2003

(86) PCT No.: PCT/JP03/12778

§ 371 (c)(1),
(2), (4) Date: Apr. 6, 2005

(87) PCT Pub. No.: WO2005/033812

PCT Pub. Date: Apr. 14, 2005

(65) Prior Publication Data

US 2005/0270907 A1 Dec. 8, 2005

(51) Int. Cl.
*G04B 47/00* (2006.01)
*H04L 7/00* (2006.01)
*H04L 12/28* (2006.01)
*H04L 12/403* (2006.01)

(52) U.S. Cl. ............ 368/10; 368/46; 340/825.21; 340/825.5; 370/254; 370/438; 370/458; 370/503; 370/509; 709/208

(58) Field of Classification Search ............... 368/10, 368/46, 47, 52; 340/825.2, 825.21, 825.5; 370/254, 438, 475, 400, 503, 509; 709/208
See application file for complete search history.

(56) References Cited

U.S. PATENT DOCUMENTS

| | | | | |
|---|---|---|---|---|
| 4,669,070 A | * | 5/1987 | Bell | 369/44.18 |
| 5,734,329 A | * | 3/1998 | Khosrowpour et al. | 340/825.21 |
| 5,751,220 A | * | 5/1998 | Ghaffari | 340/825.21 |
| 5,758,127 A | * | 5/1998 | MacAulay et al. | 710/71 |
| 6,112,230 A | * | 8/2000 | Monch et al. | 709/208 |
| 6,148,002 A | * | 11/2000 | Patel et al. | 370/438 |
| 6,891,805 B1 | * | 5/2005 | Hines | 370/254 |

FOREIGN PATENT DOCUMENTS

| | | |
|---|---|---|
| JP | 64-68862 A | 3/1989 |
| JP | 1-102669 A | 4/1989 |
| JP | 2000-506660 A | 3/2000 |
| WO | WO 99/14643 A1 | 3/1999 |

OTHER PUBLICATIONS

International Preliminary Examination Report.

* cited by examiner

*Primary Examiner*—Vit W. Miska
(74) *Attorney, Agent, or Firm*—Sughrue Mion, PLLC

(57) ABSTRACT

A transmitter simultaneously notifies a start of providing identification codes to controlled devices using a first identification code provision start signal. A delay unit transmits a second identification code provision start signal to only the controlled device adjacent to a controller. After a level detector detects the first and the second identification code provision start signals, an ID provider provides identification codes to the controlled device. A delay unit sequentially transmits the second identification code provision start signal and an identification code provision end signal to the controlled device adjacently connected at a farther side from the controller than from the self device.

10 Claims, 4 Drawing Sheets

SEQUENCE CONTROLLER

TECHNICAL FIELD

The present invention relates to a sequence controller configured by a controller and a plurality of controlled devices. More particularly, the present invention relates to a sequence controller that sets identification codes (device numbers) to a plurality of controlled devices at the initialization time.

BACKGROUND ART

In automatic production facilities at a plant, a sequence controller that controls devices is often configured by one controller and a plurality of controlled devices, thereby establishing a distributed control system. In this case, several dozens of buses are often connected to the controlled devices.

In the distributed control system, identification codes (device numbers) need to be allocated to the respective devices to connect between the devices. Conventionally, an identification code setter is provided in each device, and each identification code setter is manually operated to set an identification code to each device. However, this manual setting method faces a high risk of erroneous setting due to an operation error.

According to Patent Literature 1, an electronic exchange system automatically sets device numbers to a plurality of devices that constitute the electronic exchange system.

According to an invention described in the Patent Literature 1, a reference device and a plurality of devices are connected in series using two data lines respectively. The reference device transmits basic signals A and B, having a predetermined delay difference, to a first device via the two data lines. The first device detects the delay difference between the basic signals A and B, and sets a device number of the self device (the first device) based on the detected delay difference. At the same time, the first device gives a predetermined delay difference to the received basic signals A and B, and transmits the basic signals A and B, having the further delay difference, to a second device via two data lines. The second device detects the delay difference between the received basic signals A and B having the further delay difference, and sets a device number of the self device (the second device) based on the detected delay difference. At the same time, the second device further gives a predetermined delay difference to the received basic signals A and B, and transmits the basic signals A and B, having the still further delay difference, to a third device via two data lines. The third device, a fourth device, and subsequent devices execute similar processing, respectively.

For example, "1" is set to the reference device as a device number of the reference device, and a delay difference of two clocks is determined to correspond to the numeric value "1". Assuming that a delay difference between the basic signal A and B transmitted from a reference device 1 is four clocks, the first device receives the basic signals A and B, and sets "2" as a device number of the self device. At the same time, the first device gives a further delay difference to the basic signals A and B, and transmits the basic signals A and B, having a delay difference of six clocks, to the second device. The second device receives the basic signals A and B having the delay difference of six clocks, and sets "3" as a device number of the self device. At the same time, the second device gives a further delay difference to the basic signals A and B, and transmits the basic signals A and B, having a delay difference of eight clocks, to the third device. Subsequent devices carry out a similar operation.

According to the above conventional technique, however, each device needs to receive and output the two basic signals A and B, respectively. Therefore, each device requires four contacts in total, for two inputs and two outputs, to propagate the basic signals A and B. Since each device has many contacts, many pins are required for connectors. Unlike the electronic exchanger, the sequence controller configures a system by connecting small-scale devices with several dozens of buses. Therefore, when the above conventional technique is employed, cost ratio for the pins increase. A rise in the expense due to many pins substantially increases the total cost of the system. Since the conventional technique requires the two basic signals A and B having a delay difference, each device requires two systems of signal transmission units, which increases cost.

According to the conventional technique, when the basic signals having a delay difference are affected by noise in the environment of many disturbances such as noise, the basic signals provide wrong identification codes. Therefore, these signals require a separate noise removing function. In other words, when an error occurs in the identification code, communication itself becomes impossible. Therefore, an error detecting function having at least the same level as that of an error detecting function for data transmission is necessary for the transmission of the basic signals. Provision of an error detector equivalent to that for data transmission as represented by a cyclic code, as a noise countermeasure for the transmission of the basic signals, increases the cost.

The error detector for the basic signals can be omitted, when the error detector is shared with a data transmitter. However, when controlled devices are added to the sequence controller, it is necessary to provide identification codes after completion of a data transmission or provide identification codes by interrupting a data transmission. Therefore, identification code provision processing cannot be carried out during a data transmission.

The present invention has been achieved in order to solve the above problems, and it is an object of the present invention to provide a low-cost sequence controller that does not provide a wrong identification code due to the influence of noise.

Patent Literature 1 (Japanese Patent Application Laid-Open No. S64-68862).

DISCLOSURE OF THE INVENTION

The sequence controller according to the present invention is a sequence controller that has one controller and a plurality of controlled devices connected in series via different routes from those used for data transmission, and provides an identification code to the controlled devices, and the controller includes a first transmitting unit that outputs a first identification code provision start signal to all the controlled devices to simultaneously notify that provision of the identification code is started; and a second transmitting unit that outputs a second identification code provision start signal to notify that provision of the identification code is started and an identification code provision end signal to notify that the provision of the identification code ends to a controlled device adjacently connected to the self device, and each controlled device includes an identification code provision timing detecting unit that detects the first and the second identification code provision start signals and the identification code provision end signal; an identification code providing unit that provides the identification code based on a header identification code after the identification code provision timing detecting unit detects the first and the second identification code provision start signals; and a third transmitting unit that notifies the second identification code provision start signal and the identification code provision end signal to a latter-stage controlled device.

According to the present invention, a first transmitting unit of a controller simultaneously notifies to each controlled device that operation of providing an identification code is started using a first identification code provision start signal. A second transmitting unit of the controller notifies a second identification code provision start signal to only a controlled device adjacent to the controller. After an identification code provision signal detecting unit of the controlled device detects the first and the second identification code provision start signals, an identification code providing unit of the controlled device provides an identification code to the self device based on a header identification code to be provided to the self device. A third transmitting unit of the controlled device sequentially notifies the second identification code provision start signal and an identification code provision end signal to latter-stage controlled devices.

BEST MODE FOR CARRYING OUT THE INVENTION

The present invention is explained in detail with reference to the accompanying drawings.

Figure 1:
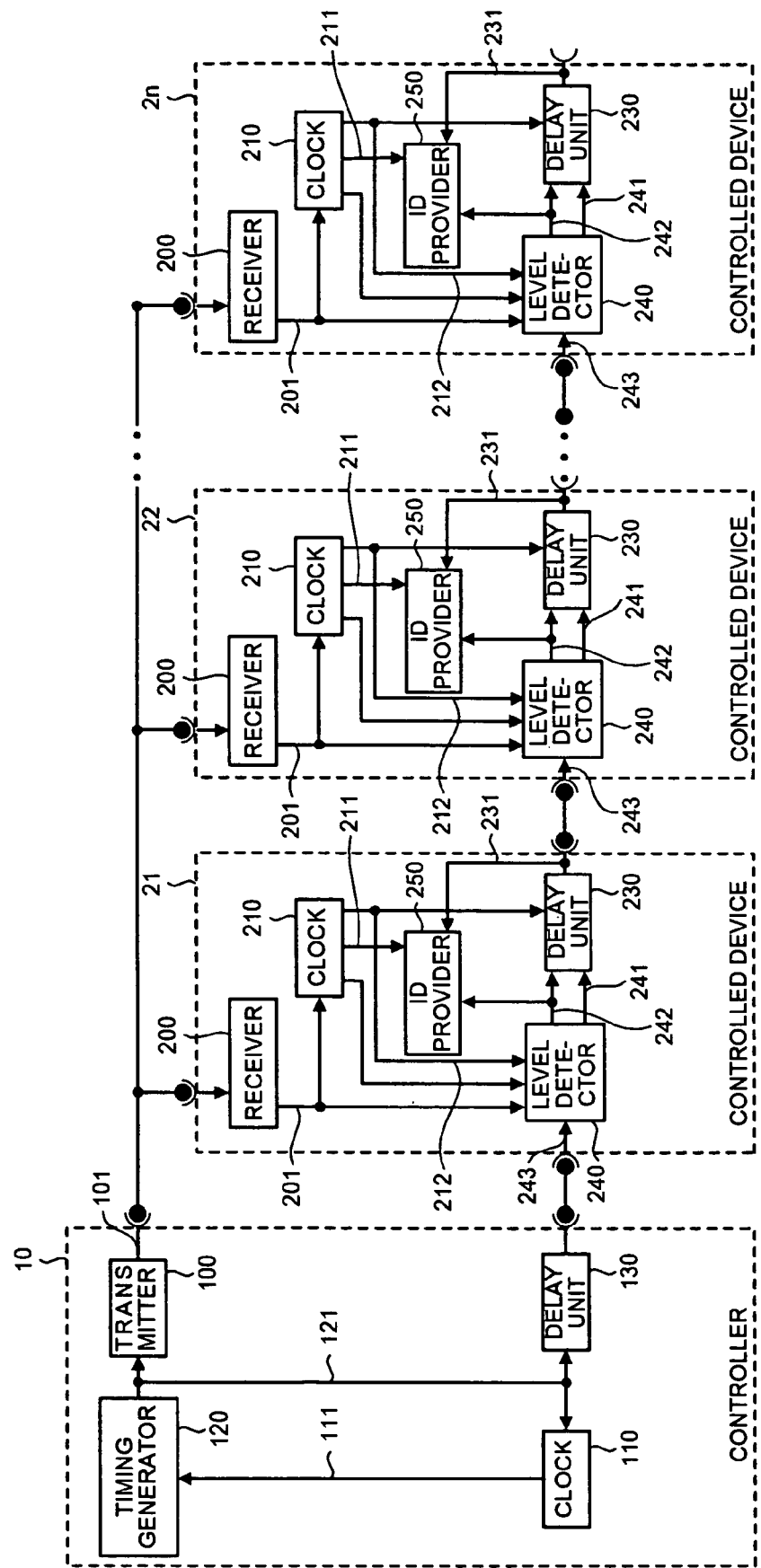
FIG. 1 is a block diagram of a configuration of a sequence controller according to an embodiment of the present invention.

An embodiment of the present invention is explained below with reference to FIG. 1 to FIG. 4. FIG. 1 is a block diagram of a configuration of a sequence controller according to the embodiment of the present invention. The sequence controller according to the embodiment includes a controller 10, and n (where n is a natural number) controlled devices 21 to 2n. The controlled device 21 is a first controlled device from the controller 10, the controlled device 22 is a second controlled device from the controller 10, and so on, and the controlled device 2n is an n-th controlled device from the controller 10.

The controller 10 transmits a first identification code provision start signal to the controlled devices 21 to 2n to notify these controlled devices a start of providing an identification code via a data transmission communication route. The controller 10 also outputs a second identification code provision start signal to notify a start of providing an individual identification code and an identification code provision end signal to notify an end of providing the identification code to the first controlled device 21 adjacent to the self device via a transmission route different from the data transmission communication route. The controller 10 includes a timing generator 120, a transmitter 100 (a first transmitting unit in claims), a clock 110 (a clock unit in claims), and a delay unit 130 (a second transmitting unit in claims).

The timing generator 120 generates identification code provision signals (an identification code provision start signal and an identification code provision end signal) for controlling a timing of providing identification codes to the controlled devices 21 to 2n respectively. The timing generator 120 outputs an identification code provision start signal to the transmitter 100, the clock 110, and the delay unit 130 via a transmission route 121. The timing generator 120 also receives an identification code provision end signal to indicate a lapse of an identification code provision time from the clock 110 via a transmission route 111, and outputs the identification code provision end signal to the delay unit 130 via the transmission route 121.

The transmitter 100 receives the identification code provision start signal from the timing generator 120 via the transmission route 121, and transmits the identification code provision start signal to the controlled devices 21 to 2n via a communication route 101. Specifically, a transmission system is determined in advance such that a delay in data transmission between units is set within an error span, and modulation and demodulation are carried out regularly at a constant timing. The transmitter 100 generates a frame having a code that enables each receiver 200 of the controlled devices 21 to 2n to recognize the frame as a certain inherent frame, and transmits a first identification code provision start signal as a part of the data to be transmitted.

At the time of transmitting the first identification code provision start signal as a part of the data, the transmitter 100 adjusts a time relation between the first identification code provision start signal and a second identification code provision start signal that is output to the adjacent controlled device 21. Specifically, in order to output a second identification code provision start signal to the controlled device 21 before the timing of obtaining the first identification code provision start signal from a part of data received by the controlled devices 21 to 2n, the transmitter 100 outputs the data including the first identification code provision start signal to the communication route 101 by delaying this output by a predetermined time from the output timing of the second identification code provision start signal output by the delay unit 130.

The delay unit 130 adjusts the timing of the identification code provision signal input via the transmission route 121. Specifically, in order to output a second identification code provision start signal to the controlled device 21 after the timing of obtaining a first identification code provision start signal from a part of data received by the controlled devices 21 to 2n, the delay unit 130 delays the identification code provision start signal by a predetermined time. The delay unit 130 then outputs the second identification code provision start signal which is the identification code provision start signal delayed by the predetermined time, to the controlled device 21. In order to output a second identification code provision start signal to the controlled device 21 after the timing of obtaining a first identification code provision start signal from a part of data received by the controlled devices 21 to 2n, and when an identification code provision end signal is input, the delay unit 130 outputs the input identification code provision start signal and the identification code provision end signal directly to the controlled device 21. In other words, the delay unit 130, together with the transmitter 100, adjusts the timing of outputting the first identification code provision start signal to the controlled devices 21 to 2n and the timing of outputting the second identification code provision start signal to the controlled device 21. The second identification code provision start signal which is output to the controlled device 21 is input to a level detector 240 via an identification code provision timing input 243 of the controlled device 21.

The clock 110 measures time required to provide an identification code to the controlled devices 21 to 2n. Specifically, when an identification code provision start signal is input to the clock 110 from the timing generator 120 via the transmission route 121, the clock 110 starts measuring time. After the lapse of time required to provide an identification code to the controlled devices 21 to 2n, the clock 110 outputs the identification code provision end signal to the timing generator 120 to notify about the lapse of the identification code provision time via the transmission route 111.

Each of the controlled devices 21 to 2n receives a first identification code provision start signal and a second identification code provision start signal to the self device, and provides the identification code to the self device. When each of the controlled devices 21 to 2n receives the second identification code provision start signal to the self device, the controlled device delays the second identification code provision start signal by the time corresponding to the number of identification codes to the self device, and then outputs the delayed second identification code provision start signal to a controlled device adjacently connected at a farther side from the controller 10 than from the self device (hereinafter, "latter-stage controlled device"). When each of the controlled devices 21 to 2n receives an identification code provision end signal, the controlled device outputs the identification code provision end signal to the latter-stage controlled device. In other words, each of the controlled devices 21 to 2n provides the identification code to the self device, and sequentially transmits the second identification code provision start signal and the identification code provision end signal to the latter-stage controlled devices.

The controlled devices 21 to 2n have the same functions respectively. A detailed configuration is explained by taking the controlled device 21 as an example. The controlled device 21 includes a receiver 200 (an identification code provision signal detecting unit in claims), a clock 210, a delay unit 230 (a third transmitting unit in claims), the level detector 240 (an identification code provision timing detecting unit in claims), and an ID (identification) provider 250 (an identification code providing unit in claims).

The receiver 200 receives data transmitted from the transmitter 100 of the controller 10 via the communication route 101, and obtains a first identification code provision start signal. Specifically, the receiver 200 receives an inherent frame and a frame having a recognizable code transmitted from the transmitter 100 of the controller 10, thereby obtaining the first identification code provision start signal. The receiver 200 outputs a start timing obtaining signal that indicates that the first identification code provision start signal is obtained, to the clock 210 and the level detector 240, via a transmission route 201.

When the start timing obtaining signal is input via the transmission route 201, the clock 210 initializes a count value, and starts counting up from zero. The clock 210 outputs a count value 211 counted after the input of the identification code provision start signal, to the ID provider 250. An upper limit value of count up by the clock 210 is equal to a value of the identification code provided by the sequence controller. When a count value exceeds the upper limit value, the clock 110 outputs excess information indicating the overflow to the level detector 240.

The clock 210 outputs a count up interval as a count up timing 212, to the level detector 240 and the delay unit 230. The count up interval is set to a value equal to or above a data transmission error detection width. For detecting a data transmission error, an encoding technique according to a cyclic code or the like is conventionally used. In the error detection according to a cyclic code, there is a maximum value up to which continuous errors can be detected for each encoding system. Bit errors that continue by a certain value or above cannot be detected. A maximum time during which errors can be detected is obtained by multiplying a time required to transmit one bit by a maximum number of bits by which continuous errors can be detected. This maximum time during which errors can detected is set as an error detection width. The count up timing 212 is used to interrupt provision of an identification code when a data error occurs within time guaranteed for detection of data transmission errors by a simple method, when the controller 10 of the sequence controller according to the present invention provides identification codes to the controlled devices 21 to 2n.

The level detector 240 generates an identification code provision state 1 timing 241 and an identification code provision state 2 timing 242, from the start timing obtaining signal input via the transmission route 201 and the second identification code provision start signal and the identification code provision end signal input from the identification code provision timing input 243 of the self device. The identification code provision state 1 timing 241 is used to notify an end of provision of the identification code. The identification code provision state 2 timing 242 is used to notify a timing of determining the number of a header identification code of the identification codes to be provided to the self device. The level detector 240 outputs the identification code provision state 1 timing 241 to the delay unit 230, and outputs the identification code provision state 2 timing 242 to both the ID provider 250 and the delay unit 230.

When the level detector 240 detects a level change due to noise during a period from the reception of the start timing obtaining signal and the second identification code provision start signal of the self device till the reception of the identification code provision end signal, or when the level detector 240 receives excess information from the clock 110, the level detector 240 notifies an end (interruption) of provision of the identification code at the identification code provision state 1 timing 241 to the delay unit 230.

The delay unit 230 outputs the identification code provision state 2 timing 242 which is delayed corresponding to the value of the identification code to be provided to the self device in the unit of the count up timing 212, to an identification code provision timing output 231. The delayed identification code provision state 2 timing 242 is transmitted to both the latter-stage controlled device and the ID provider 250 (the signal to be transmitted to the latter-stage controlled device becomes the second identification code provision start signal to the latter-stage controlled device). When the end of the provision of the identification code is notified at the identification code provision state 1 timing 241 from the level detector 240, the delay unit 230 immediately interrupts the delay processing of the identification code provision state 2 timing 242, and immediately outputs the identification code provision end signal to the identification code provision timing output 231.

The ID provider 250 latches the count value 211 at the identification code provision state 2 timing 242, and completes the provision of the identification code at the identification code provision state 1 timing 241.

Figure 2:
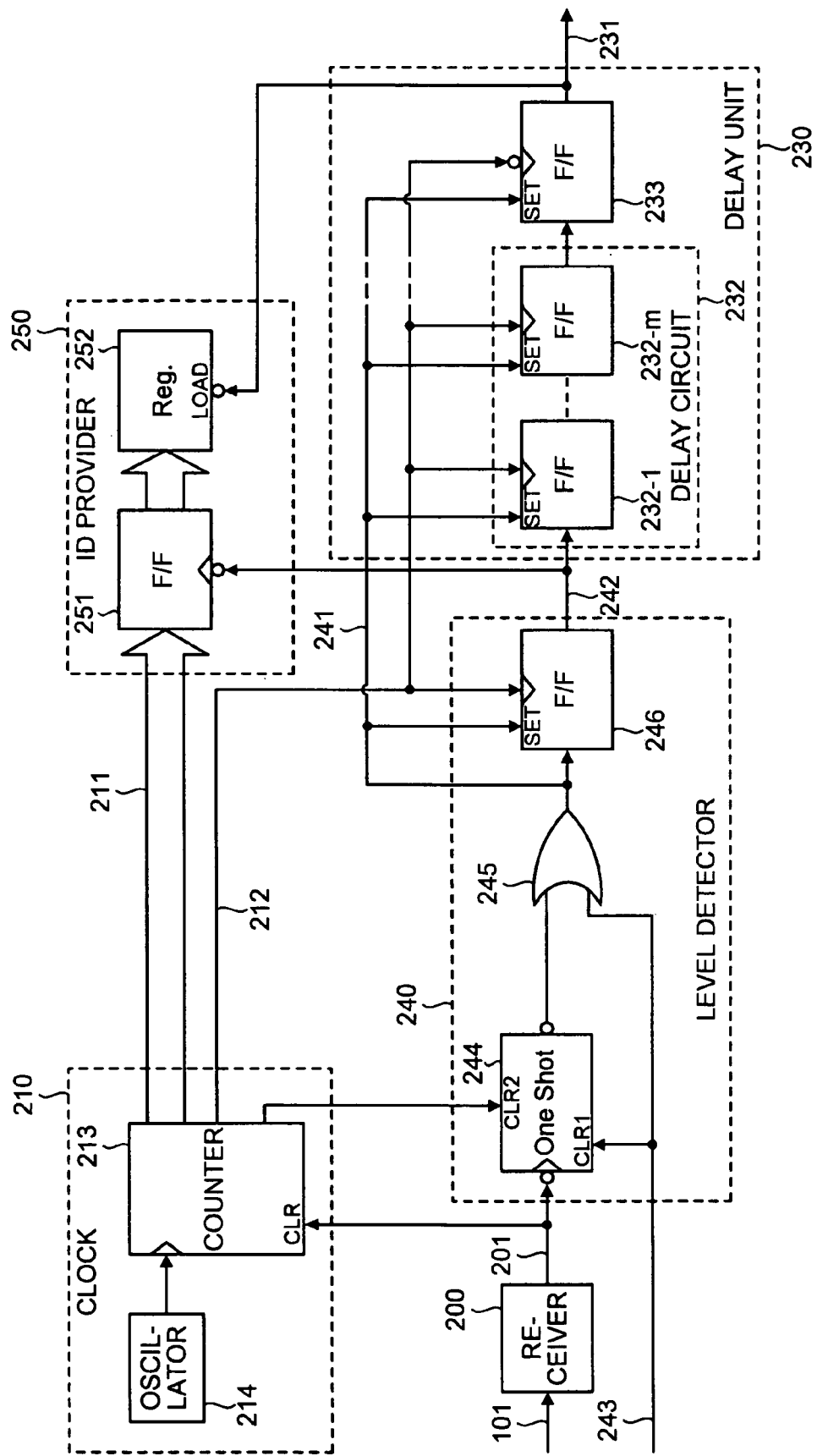
FIG. 2 is a circuit diagram of a detailed configuration of a controlled device shown in FIG. 1.

FIG. 2 is an example of a circuit diagram of a detailed configuration of the controlled device 21 shown in FIG. 1. The receiver 200 receives data transmitted from the transmitter 100 of the controller 10 via the communication route 101, and obtains a first identification code provision start signal. The receiver 200 outputs a start timing obtaining signal, which indicates that the first identification code provision start signal is obtained, to a CLR terminal of a counter 213 and a clock terminal of a one shot circuit 244, via the transmission route 201.

The clock 210 has an oscillator 214 and the counter 213. The oscillator 214 outputs a pulse (a system clock) of a constant time interval to the clock terminal of the counter 213.

When a start timing obtaining signal is input, the counter 213 initializes the count value 211 (sets the count value to "0"), and counts the number of system clocks generated by the oscillator 214. The counter 213 outputs a predetermined upper bit of a binary count value, as the count value 211, to a data terminal of a flip-flop 251. The counter 213 outputs one digit below the predetermined upper bit of the binary count value output as the count value 211, as the count up timing 212, to clock terminals of flip-flops 246, 232-1 to 232-$m$ (0$\leq$m, where m is an integer), and 233. In other words, the counter 213 outputs a pulse of a cycle equal to the interval of counting up the count value 211, as the count up timing 212, to the clock terminals of the flip-flops 246, 232-1 to 232-$m$ (0$\leq$m, where m is an integer), and 233. An upper limit value of the count value of the counter 213 is equal to the value of the identification code provided by the sequence controller. When the count value exceeds the upper limit value, the counter 213 outputs excess information to indicate that the count value overflows, to a CLR2 terminal of the one shot circuit 244.

The level detector 240 includes the one shot circuit 244, a logical sum OR gate 245, and the flip-flop 246.

The one shot circuit 244 holds a start timing obtaining signal that is input via the transmission route 201, as start information. The one shot circuit 244 deletes the start information when an identification code provision end signal is input, or when excess information is input from the counter 213, or when an identification code provision end signal is input from the identification code provision timing input 243 of the self device. The one shot circuit 244 outputs the start information in a negative logic to the OR gate 245. In other words, the one shot circuit 244 keeps the output at "L" while holding the start information.

The OR gate 245 outputs the identification code provision state 1 timing 241 to SET terminals of the flip-flops 246, 232-1 to 232-$m$, and 233 and the clock terminal of the flip-flop 246, based on the start information input from the one shot circuit 244 and the second identification code provision start signal and the identification code provision end signal of the self device notified via the identification code provision timing input 243. Specifically, when the one shot circuit 244 holds start information and also when the second identification code provision start signal of the self device is input (in this case, a negative logic "L" is input), the OR gate 245 sets the identification code provision state 1 timing 241 to "L". When the one shot circuit 244 deletes start information, or when an identification code provision end signal is input (in this case, "H" is input), the OR gate 245 sets the identification code provision state 1 timing 241 to "H".

The flip-flop 246 delays the identification code provision state 1 timing 241 by the time of the count up timing 212. When an identification code provision end signal does not come from the OR gate 245 by this time lapse, the flip-flop 246 determines that the ID is provided correctly, and outputs the identification code provision state 2 timing 242 indicating that the identification code provision shifts to the next state, to the clock terminal of the flip-flop 251 and the clock terminal of the flip-flop 232-1. In this case, the flip-flop 246 sets the identification code provision state 2 timing 242 to "L" to notify that the state shifts.

The delay unit 230 has a delay circuit 232 and the flip-flop 233. The delay circuit 232 has the flip-flops 232-1 to 232-$m$ of the number obtained by subtracting 1 from the number of identification codes to be provided as the self identification codes. The delay circuit 232 delays the identification code provision state 2 timing 242 by the number of the count up timing 212 corresponding to the number of the identification codes to be provided as the identification codes of the self device, and outputs the delayed identification code provision state 2 timing 242 to the data input of the flip-flop 233. Specifically, each of the controlled devices 21 to 2$n$ determines the number of necessary identification codes for the self device in advance, and determines the number of flip-flops of the delay circuit corresponding to the number of necessary identification codes. For example, when the number of necessary identification code is one, the number of flip-flop of the delay circuit 232 is zero, and the delay circuit 232 is not necessary. When the number of necessary identification codes is three, the number of flip-flops of the delay circuit 232 becomes two, and the delay circuit 232 has the flip-flops 232-1 to 232-2.

The flip-flop 233 as a half cycle delay circuit delays the output from the delay circuit 232 by a half cycle of the count up timing 212, and outputs the identification code provision timing output 231 to both a LOAD terminal of a register 252 and a latter-stage controlled device. The identification code provision timing output 231 becomes the timing of providing the identification code of the self device and the second identification code provision start signal of the latter-stage controlled device.

The ID provider 250 includes the flip-flop 251 as an ID provision flip-flop, and the register 252 as an ID provision register. The flip-flop 251 latches the count value 211 of the counter 213 at the identification code provision state 2 timing 242 that is output at the timing when the provision of the identification code is determined as normal, and outputs the count value to the register 252. The count value latched by the flip-flop 251 becomes a header identification code to be provided to the controlled device.

The register 252 obtains an identification code provision end signal from the identification code provision timing output 231 of the controlled device, and holds the count value latched by the flip-flop 251 when the provision of the identification code ends. While the count value held by the register 252 is the header identification code to be provided to the self device, the number of identification codes necessary for the self device is determined in advance, as described above. Therefore, when the header identification code is held, all IDs can be provided. For example, when the number of flip-flops of the delay circuit 232 is two, the number of necessary identification codes is three, because the number of flip-flops of the delay circuit 232 is obtained by subtracting 1 from the number of necessary identification codes. Consequently, when "3" is held in the register 252, IDs can be calculated as "3", "4", and "5".

The operation of the sequence controller according to the present embodiment of the present invention is explained next.

The timing generator 120 of the controller 10 outputs an identification code provision start signal to the transmitter 100, the clock 110, and the delay unit 130 via the transmission route 121. The clock 110 starts measuring time required to provide identification codes to the controlled devices 21 to 2n.

The transmitter 100 generates a frame including a first identification code provision start signal, and transmits the generated frame as a part of data for data transfer, to the communication route 101. The delay unit 130 adjusts the timing of the identification code provision start signal, and outputs a second identification code provision start signal to the adjacent controlled device 21. The second identification code provision start signal is input to the level detector 240 of the controlled device 21 via the identification code provision timing input 243 of the controlled device 21.

The receiver 200 of the controlled device 21 receives the data transmitted from the transmitter 100 of the controller 10 via the communication route 101, thereby obtaining the first identification code provision start signal. The receiver 200 of the controlled device 21 outputs a start timing obtaining signal, which indicates that the first identification code provision start signal is obtained, to the clock 210.of the controlled device 21 and the level detector 240 of the controlled device 21, via the transmission route 201 of the controlled device 21.

When the start timing obtaining signal is input, the clock 210 of the controlled device 21 initializes the count value, and starts counting up from zero.

Each of the controlled devices 22 to 2n receives the data transmitted from the transmitter 100 of the controller 10 via the communication route 101, and starts counting up, in a similar manner to that of the controlled device 21.

The level detector 240 of the controlled device 21 generates the identification code provision state 2 timing 242 at the count up timing 212 immediately after the start timing obtaining signal is input and also the second identification code provision start signal is input. Specifically, after the count value 211 of the clock 210 of the controlled device 21 is counted up, the level detector 240 generates the identification code provision state 2 timing 242 by delaying the timing by a half cycle of the count up interval. The level detector 240 of the controlled device 21 outputs the identification code provision state 2 timing 242 to the delay unit 230 and the ID provider 250 of the controlled device 21.

When the identification code provision state 2 timing 242 is input, the ID provider 250 of the controlled device 21 temporarily holds the count value 211 of the clock 210 of the controlled device 21.

Each of the controlled devices 22 to 2n is not yet input with the second identification code provision start signal to the self controlled device. Therefore, the level detector 240 of each of the controlled devices 22 to 2n does not generate the identification code provision state 2 timing 242. As a result, the ID provider 250 does not temporarily hold the count value. In other words, the clock 210 of each of the controlled devices 22 to 2n carries out only count operation.

The delay unit 230 of the controlled device 21 delays the identification code provision state 2 timing 242 by the cycle of the count up timing 212 of the number obtained by subtracting 1 from the number of identification codes to be provided to the self device. The delay unit 230 of the controlled device 21 further delays the delayed identification code provision state 2 timing 242 by a half cycle of the count up timing 212 and generates the identification code provision timing output 231. The delay unit 230 of the controlled device 21 outputs the identification code provision timing 231 to the ID provider 250 of the controlled device 21 and to the controlled device 22. When the identification code provision timing output 231 is input, the ID provider 250 of the controlled device 21 holds the temporarily-held count value as an identification code.

In order to provide one identification code to the controlled device 21, for example, the delay unit 230 of the controlled device 21 delays the identification code provision state 2 timing 242 for the ID provider 250 of the controlled device 21 to temporarily hold the count value 211, by half cycle of the count up timing 212, thereby generating the identification code provision timing output 231. Therefore, after a half cycle of the count up timing 212 since the ID provider 250 of the controlled device 21 temporarily holds the count value 211, the identification code is provided to the controlled device 21, and the provision of an identification code to the controlled device 22 is also started.

In order to provide two identification codes to the controlled device 21, for example, the delay unit 230 of the controlled device 21 delays the identification code provision state 2 timing 242 for the ID provider 250 of the controlled device 21 to temporarily hold the count value 211, by 1.5 cycles of the count up timing 212, thereby generating the identification code provision timing output 231. Therefore, after 1.5 cycles of the count up timing 212 since the ID provider 250 of the controlled device 21 temporarily holds the count value 211, the identification code is provided to the controlled device 21, and the provision of an identification code to the controlled device 22 is also started. The number of identification codes provided by each of the controlled devices 21 to 2n is preset before the identification code provision operation is started.

A relation between the count value 211 of the controlled device 21 and the second identification code provision start signal to the controlled device 22 is considered. The controlled device 21 outputs the second identification code provision start signal to the controlled device 22 at the timing of counting up the self count value 211 that the self ID provider 250 temporarily holds, by the number obtained by subtracting 1 from the number of identification codes to be provided to the self device.

For example, when the count value 211 that the ID provider 250 of the controlled device 21 temporarily holds is "0" and also when the number of identification codes to be provided to the self device is one, the controlled device 21 outputs the second identification code provision start signal to the controlled device 22 at the timing when the self count value 211 changes from "0" to "1".

When the count value 211 that the ID provider 250 of the controlled device 21 temporarily holds is "0" and also when the number of identification codes to be provided to the self device is two, the controlled device 21 outputs the second identification code provision start signal to the controlled device 22 at the timing when the self count value 211 changes from "1" to "2".

The controlled device 22 already obtains the identification code provision timing from the data transmitted from the transmitter 100 of the controller 10 via the communication route 101. Therefore, the clock 210 of the controlled device 22 already starts counting up from zero at the same timing as that of the clock 210 of the controlled device 21. Therefore, when the second identification code provision start signal is input from the controlled device 21 to the level detector 240 of the controlled device 22, the count value 211 of the controlled device 22 becomes a value obtained by adding the number of identification codes provided to the controlled device 21 to a value indicating the header identification code provided to the controlled device 21. For example, when the header identification code provided to the controlled device 21 is "0" and also when two identification codes are provided to the controlled device 21, the count value 211 when the second identification code provision start signal is input to the level detector 240 of the controlled device 22 becomes "2". The controlled device 22 carries out operation similar to that of the controlled device 21, provides the identification code to the self device, and outputs a second identification code provision start signal to the next controlled device.

Each of the n controlled devices 21 to 2n carries out operation similar to that of the controlled device 21 and provides an identification code to the self device, in the order of the device connected nearest to the controller 10.

The clock 110 of the controller 10 starts measuring time required to provide identification codes to the controlled devices 21 to 2n since the identification code provision start signal is input from the timing generator 120. After the time required to provide identification codes to the controlled devices 21 to 2n passes, the clock 110 outputs the identification code provision end signal, indicating the lapse of the identification code provision time, to the timing generator 120 via the transmission route 111.

When the end of the provision of the identification code is notified, the timing generator 120 outputs the identification code provision end signal to the delay unit 130 via the transmission route 121. The delay unit 130 outputs the identification code provision end signal directly to the controlled device 21. The identification code provision end signal output from the delay unit 130 is input to the level detector 240 via the identification code provision timing input 243 of the controlled device 21.

When detecting the identification code provision end signal, the level detector 240 of the controlled device 21 immediately outputs the identification code provision end signal to the delay unit 230 of the self device. At the same time, the level detector 240 deletes the start information according to the start information obtaining signal. When detecting the identification code provision end signal, the delay unit 230 of the controlled device 21 immediately outputs the identification code provision end signal to the identification code provision timing input 243 of the controlled device 22.

When the identification code provision end signal is input from the identification code provision timing input 243 of the self device, each of the controlled devices 22 to 2n repeats the operation similar to that of the controlled device 21, and sequentially transmits the identification code provision end signal, thereby transmitting the identification code provision end signal to all the controlled devices.

When the identification code provision end signal is detected before the second identification code provision start signal is output to the latter-stage controlled device, the level detector 240 of each of the controlled devices 21 to 2n does not generate the identification code provision state 2 timing 242. Therefore, the ID provider 250 of each of the controlled devices 21 to 2n cannot temporarily hold the count value 211 of the self device, and does not provide the identification code to the self device accordingly. Since the second identification code provision start signal to the latter-stage controlled device is a delayed signal of the identification code provision state 2 timing 242, the controlled device does not output the second identification code provision start signal to the latter-stage controlled device.

Detailed operation of the controlled device is explained next with reference to the detailed configuration of the controlled device shown in FIG. 2.

The receiver 200 receives data transmitted from the transmitter 100 of the controller 10, and obtains a first identification code provision start signal. The receiver 200 outputs a start timing obtaining signal that indicates that the identification code provision start signal is obtained, to the CLR terminal of the counter 213 and the clock terminal of the one shot circuit 244, via the transmission route 201.

When the start timing obtaining signal is input to the CLR terminal, the counter 213 sets the count value 211 to "0", and starts counting the number of the system clocks generated by the oscillator 214.

When the start timing obtaining signal is input, the one shot circuit 244 holds this signal as start information. While holding the start information, the one shot circuit 244 outputs "L" to the OR gate 245.

The OR gate 245 sets the identification code provision state 1 timing 241 to "L" when the one shot circuit 244 holds the start information and also when the second identification code provision start signal of the self device is input (in this case, a negative logic "L" is input).

The flip-flop 246 latches the identification code provision state 1 timing 241 by delaying the timing by a half cycle from a change point of the count value 211, and outputs the timing as the identification code provision state 2 timing 242.

The flip-flop 251 latches the count value 211 of the counter 213 at the identification code provision state 2 timing 242 and temporarily holds the value.

The delay circuit 232 configured by the flip-flops 232-1 to 232-m delays the identification code provision state 2 timing 242 by the number of the count up timing 212 corresponding to the number of identification codes provided as the identification codes of the self device. The flip-flop 233 further delays the delayed identification code provision state 2 timing 242 by a half cycle of the count up timing 212, and outputs the identification code provision timing output 231 to the register 252 and a latter-stage controlled device.

The register 252 holds the count value temporarily held in the flip-flop 251 at the identification code provision timing output 231. In other words, the register 252 holds a header identification code provided to the self device. Then, the register 252 provides the identification code of the self device based on the held header identification code.

On the other hand, when excess information is input from the counter 213, or when an identification code provision end signal is input based on the identification code provision timing input 243 of the self device, the one shot circuit 244 deletes the start information. In other words, the one shot circuit 244 sets the output to "H".

When the OR gate 245 detects that the start information of the one shot circuit 244 is deleted or that the identification code provision end signal is input from the identification code provision timing input 243 of the self device, the OR gate 245 sets the identification code provision state 1 timing 241 to "H".

The flip-flops 246, 232-1 to 232-m, and 233 interrupt the delay operation at the identification code provision state 1 timing 241, and become initialized, thereby interrupting the provision of the identification code. The flip-flop 233 immediately outputs an identification code provision end to the identification code provision timing input 243 of a latter-stage controlled device.

Figure 3:
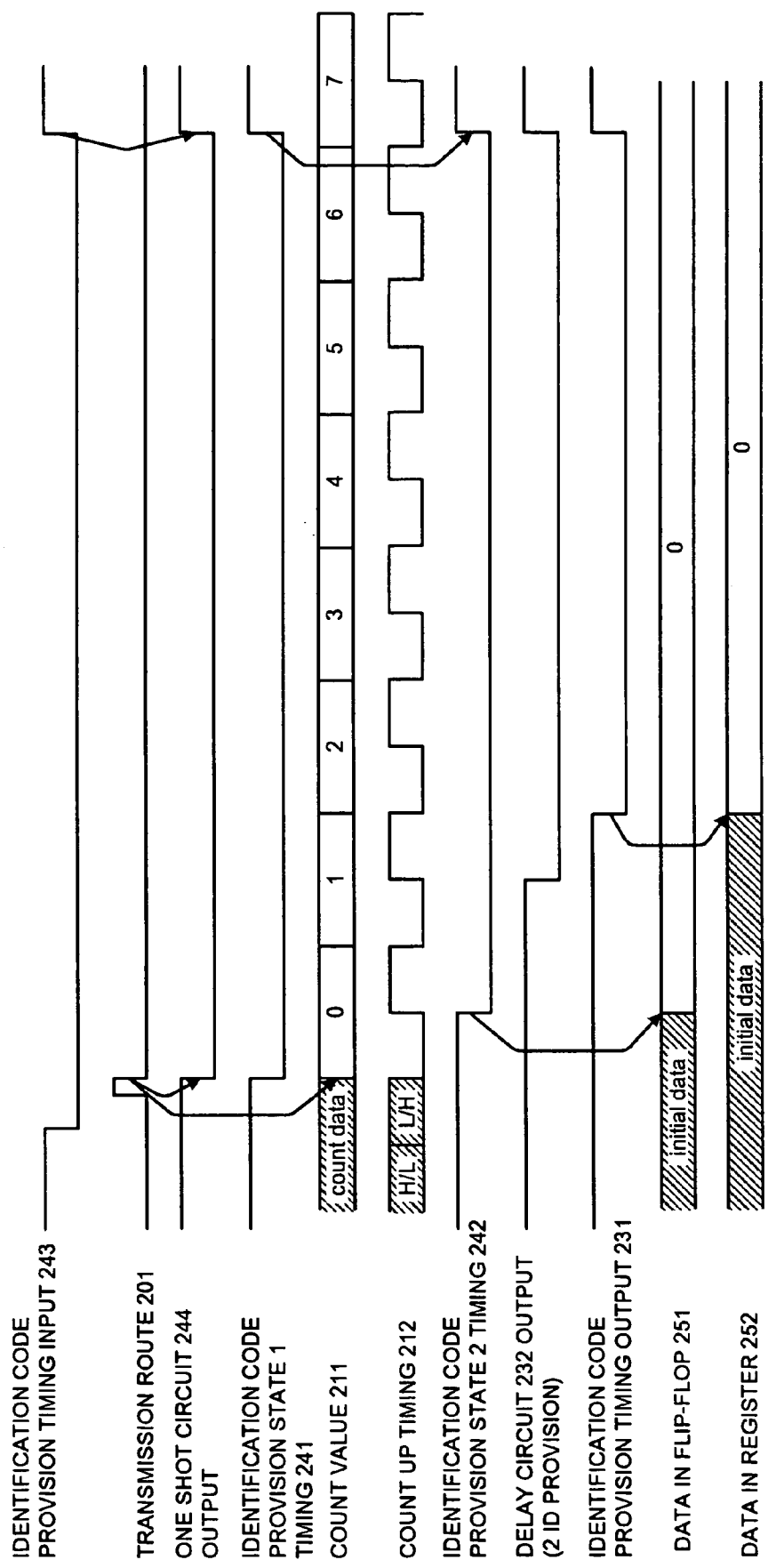
FIG. 3 is an example of a timing chart that the sequence controller provides two identification codes to a controlled device adjacent to a controller.
Figure 4:
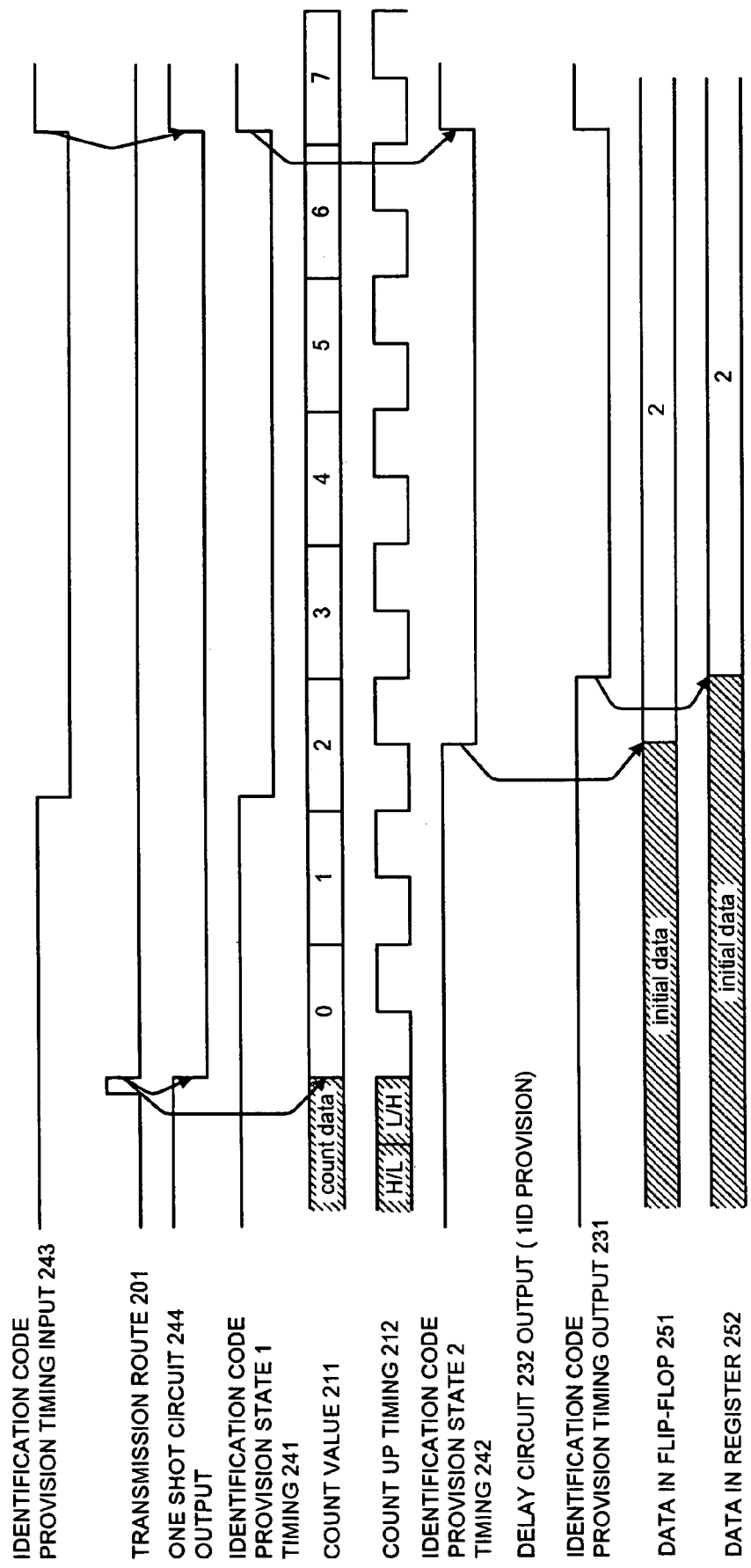
FIG. 4 is an example of a timing chart that the sequence controller provides one identification code to a controlled device adjacent to a controlled device.

FIG. 3 is an example of a timing chart of the controlled device 21 when the sequence controller provides identification codes "0" and "1" to the controlled device 21. FIG. 4 is an example of a timing chart of the controlled device 22 when the sequence controller provides identification codes "0" and "1" to the controlled device 21 and provides an identification code "2" to the controlled device 22.

In FIG. 3 and FIG. 4, the timing when the identification code provision timing input 243 changes from "H" to "L" is the second identification code provision start signal, and this timing for the controlled device 21 is different from the timing for the controlled device 22. With this arrangement, "0" is provided to the controlled device 21 as the header identification code, and "2" is provided to the controlled device 22 as the header identification code.

Since two identification codes are provided to the controlled device 21, the number of flip-flops of the delay circuit 232 is one. Since one identification code is provided to the controlled device 22, the delay circuit 232 is not present. Therefore, there is no output signal from the delay circuit 232 in FIG. 4.

Since the operation of the controlled device is already explained with reference to FIG. 1 and FIG. 2, only the states that signals shown in FIG. 3 and FIG. 4 indicate are explained.

The timing when the identification code provision timing input 243 changes from "H" to "L" indicates the second identification code provision start signal. The timing when the identification code provision timing input 243 changes from "L" to "H" indicates the identification code provision end signal. In other words, the identification code provision timing input 243 indicates by "L" the period from the second identification code provision start signal to the self device till the identification code provision end signal.

When the transmission route 201 is "H", this is the period of the start timing obtaining signal that indicates that the receiver 200 detects the first identification code provision start signal. When the start timing obtaining signal changes from "H" to "L", the one shot circuit 244 sets the output to "L". In other words, the one shot circuit 244 sets the output to "L" to indicate the holding of the start information, and sets the output to "H" to indicate the deletion of the start information.

The identification code provision state 1 timing 241 indicates by "L" the identification code provision period of the self device, that is, the period from when the one shot circuit 244 holds the start information and also obtains the second identification code provision start signal till when the identification code provision end signal is obtained.

The identification code provision state 2 timing 242 becomes "L" when a half cycle of the count up timing 212 is delayed after the count value 211 indicates the header identification code to be provided to the self device. When the identification code provision state 2 timing 242 changes from "H" to "L", the flip-flop 251 latches and temporarily holds the header identification code to be provided to the self device.

A change point of the identification code provision timing output 231 from "H" to "L" indicates the second identification code provision start signal to the latter-stage controlled device. A change point of the identification code provision timing output 231 from "L" to "H" indicates the identification code provision end signal to the latter-stage controlled device.

The operation of the sequence controller when certain controlled devices are already provided with identification codes and when a further controlled device is added is explained next. It is assumed herein that identification codes are already provided to n–1 controlled devices 21 to 2n–1 within the sequence controller and that a controlled device n is added to a latter stage of the controlled device 2n–1.

The controller 10 periodically transmits information such as control data to the controlled devices 21 to 2n–1 that are already provided with identification codes, via the communication route 101. In order to provide an identification code to the further added controlled device n, the controller 10 transmits a first identification code provision start signal as a part of data for data transfer only once during communications with the controlled devices 21 to 2n–1. The controller 10 also outputs a second identification code provision start signal to the adjacent controlled device 21. With this arrangement, the controlled devices 21 to 2n–1 carry out identification provision operation again. In other words, the controlled devices 21 to 2n–1 sequentially transmit the second identification code provision start signal to the latter-stage controlled devices, thereby providing the identification code to the added controlled device n. In other words, when the controlled device n is newly added, the power source to the sequence controller is turned on, and the identification code is provided to the controlled device n in a similar manner to that when identification codes are provided to the controlled devices 21 to 2n–1.

During a transmission of the second identification code provision start signal, the controller 10 restarts the routine data transmission via the communication route 101, and transmits data to the controlled devices 21 to 2n during the provision of the identification code.

As explained above, even when a controlled device is newly added to the sequence controller, the controller transmits a first identification code provision start signal to all controlled devices only once at the same time. Therefore, it is sufficient to adjust timing only once for the routine data transmission and the first identification code provision start signal, thereby easily adding the controlled device.

As explained above, according to the present embodiment, the first transmitting unit of the controller simultaneously notifies to the controlled devices that the first transmitting unit starts providing the identification codes, using the first identification code provision start signal. The second transmitting unit of the controller notifies a second identification code provision start signal to only the controlled device adjacent to the controller. The identification code provision signal detecting unit of the controlled device detects the first and the second identification code provision start signals. After that, the identification code providing unit of the controlled device provides an identification code based on the header identification code to be provided to the self device. The third transmitting unit of the controlled device sequentially notifies the second identification code provision start signal and the identification code provision end signal to the latter-stage controlled devices. With this arrangement, the controlled device has three connector terminals including two for the input of the first and the second identification code provision start signals and one for the output of the second identification code provision start signal to the adjacent controlled device. In other words, a connector terminal for outputting the first identification code provision start signal can be omitted. For example, when the controlled devices are fifty sequence controllers, fifty terminals can be omitted, thereby reducing the cost of the sequence controllers.

When the first identification code provision start signal is separated from the second identification code provision start signal using different delay signals, the first identification code provision start signal can be extracted from the periodical timing in the communication data. Therefore, transmitting units of one system are sufficient to be exclusively used to provide identification codes. As a result, the system can be configured in a small scale, thereby reducing the cost of the sequence controller. A controlled device can be added, and an identification code can be provided to this controlled device, without interrupting data transmission.

When a controlled device detects noise after detecting the first and the second identification code provision start signals, the controlled device notifies the detected noise as the identification code provision end signal, to an adjacent controlled device farther from the controller than from the self device. Therefore, an error detection function of the same level or higher than the error detection level of data transmission can be easily realized.

By setting the count up timing larger than the noise interval, the controlled device can end the identification code provision operation before notifying the second identification code provision start signal to the adjacent controlled device farther from the controller than from the self device according to a level change due to noise. Therefore, errors in providing an identification code can be prevented. It is not necessary to provide a circuit to detect errors such as a cyclic code error as applied to data transmission, exclusively for providing identification codes. Therefore, identification codes can be provided at low cost in noise environment.

According to the present embodiment, as means for transmitting a first identification code provision start signal to each controlled device, this signal is notified as a part of data transmission. However, means for notifying the first identification code provision start signal to each controlled device is not limited to this. It is sufficient when the first identification code provision start signal can be simultaneously notified to each controlled device. For example, each controlled device has a switch, and a bar-shaped substance is used to simultaneously depress the switch of each controlled device, thereby notifying the first identification code provision start signal.

In order to transmit a second identification code provision start to a latter-stage controlled device, each controlled device can also have a switch, and a bar-shaped substance is used to simultaneously depress the switch of each controlled device, in a similar manner to that for notifying the first identification code provision start signal.

An internal circuit of the controlled device can have a time measuring unit. When the time measuring unit measures time and transmits the second identification code provision start signal, the identification code can be provided without configuring a logic circuit.

INDUSTRIAL APPLICABILITY

As explained above, the sequence controller according to the present invention is useful for providing identification codes to the controlled devices. Particularly, the invention is suitable for a sequence controller that sets different number of identification codes to a plurality of controlled devices at the initialization time.

What is claimed is:

1. A sequence controller comprising a controller and a plurality of controlled devices that are connected in series to the controller, wherein
the controller includes
a first transmitting unit that transmits a first identification code provision start signal to all the controlled devices to simultaneously notify that provision of the identification code is started; and
a second transmitting unit that transmits to a controlled device that is the first in the series a second identification code provision start signal to notify that provision of the identification code is started and an identification code provision end signal to notify that the provision of the identification code ends, and
each of the controlled devices includes
an identification code provision timing detecting unit that detects the first identification code provision start signal, the second identification code provision start signal, and the identification code provision end signal;
an identification code providing unit that provides a predetermined number of identification codes to the controlled device on the basis of a header identification code that is determined by timings of the first identification code provision start signal and the second identification code provision start signal; and
a third transmitting unit that transmits the second identification code provision start signal and the identification code provision end signal to a subsequent controlled device in the series.

2. The sequence controller according to claim 1, wherein the first transmitting unit and the second transmitting unit adjust timing to transmit the first identification code provision start signal and the second identification code provision start signal respectively.

3. The sequence controller according to claim 2, wherein the first transmitting unit transmits the first identification code provision start signal after the second transmitting unit transmits the second identification code provision start signal.

4. The sequence controller according to claim 2, wherein the second transmitting unit transmits the second identification code provision start signal after the first transmitting unit transmits the first identification code provision start signal.

5. The sequence controller according to claim 1, wherein the controller further includes a clock unit that counts a predetermined time that is a time required to provide identification codes to all the controlled devices, and
the second transmitting unit transmits the identification code provision end signal when time counted by the clock unit is equal to the predetermined time.

6. The sequence controller according to claim 1, wherein the identification code providing unit ends providing the identification code upon receiving the identification code provision end signal, and
the third transmitting unit transmits the identification code provision end signal to an immediately subsequent controlled device in the series immediately after receiving the identification code provision end signal.

7. The sequence controller according to claim 1, wherein the third transmitting unit transmits the second identification code provision start signal that is delayed by a time determined by the predetermined number of identification codes.

8. The sequence controller according to claim 7, wherein the identification code providing unit provides the predetermined number of identification codes when the third transmitting unit transmits the second identification code provision start signal.

9. The sequence controller according to claim 1, wherein the third transmitting unit transmits the identification code provision end signal when the identification code provision timing detecting unit detects noise after detecting the first identification code provision start signal and the second identification code provision start signal.

10. The sequence controller according to claim 1, wherein the controlled devices are connected to the controller via a first path dedicated for data transmission and are connected in series to the controller via a second path, wherein
the first transmitting unit transmits the first identification code provision start signal to the controlled devices via the first path, and
the second transmitting unit and the third transmitting unit transmit the second identification code provision start signal and the identification code provision end signal to the controlled devices via the second path.

* * * * *